United States Patent
Grubb et al.

(10) Patent No.: US 8,147,129 B2
(45) Date of Patent: Apr. 3, 2012

(54) APPARATUS FOR TESTING INFRARED SENSORS

(75) Inventors: John Grubb, County Limerick (IE); Gerard Blaney, County Limerick (IE); Eamon Culhane, County Limerick (IE)

(73) Assignee: Analog Devices, Inc., Norwood, MA (US)

( * ) Notice: Subject to any disclaimer, the term of this patent is extended or adjusted under 35 U.S.C. 154(b) by 457 days.

(21) Appl. No.: 12/420,463

(22) Filed: Apr. 8, 2009

(65) Prior Publication Data

US 2010/0260229 A1    Oct. 14, 2010

(51) Int. Cl.
*G01K 15/00* (2006.01)
*G01J 5/00* (2006.01)

(52) U.S. Cl. .............................................. 374/1; 374/121

(58) Field of Classification Search ................. 374/1, 2, 374/121
See application file for complete search history.

(56) References Cited

U.S. PATENT DOCUMENTS

| | | | | |
|---|---|---|---|---|
| 4,387,301 | A * | 6/1983 | Wirick et al. | 250/252.1 |
| 5,151,682 | A * | 9/1992 | Marinitsch | 340/514 |
| 5,175,432 | A * | 12/1992 | Reitman et al. | 250/332 |
| 7,119,326 | B2 | 10/2006 | Logsdon et al. | 250/252.1 |
| 7,858,941 | B2 * | 12/2010 | Kaushal et al. | 250/348 |
| 2007/0278384 | A1 | 12/2007 | Heppell | 250/205 |
| 2009/0194697 | A1 * | 8/2009 | Staniforth et al. | 250/338.1 |

* cited by examiner

*Primary Examiner* — Lisa Caputo
*Assistant Examiner* — Mirellys Jagan
(74) *Attorney, Agent, or Firm* — Sunstein Kann Murphy & Timbers LLP

(57) ABSTRACT

An apparatus for use with automatic testing equipment for testing infrared sensors on integrated circuits is provided. The apparatus includes an infrared source, a heat mass, and an electronic frequency modulator. The infrared source is modulated according to a predetermined test frequency such that the infrared source emits an infrared test signal representative of a test temperature and corresponding to the temperature of the heat mass and the predetermined test frequency. A signal processor, electrically coupled to an integrated circuit having an infrared sensor, receives a sensed signal from the infrared sensor in response to the infrared test signal and uses the sensed signal according to the predetermined test frequency to determine a measured temperature.

14 Claims, 4 Drawing Sheets

APPARATUS FOR TESTING INFRARED SENSORS

TECHNICAL FIELD

The present invention relates to automatic testing equipment, and more particularly to testing of infrared sensors.

BACKGROUND ART

It is known in the prior art to test integrated circuits using automatic testing equipment (ATE). ATE employ channel cards that include a plurality of pin electronics to test each channel/pin of an integrated circuit, which is referred to as a device under test (DUT). Standard in most pin electronics are a comparator circuit for comparing the input from the pin under test to an expected value, a driver circuit for testing a condition on a pin, an active load for simulating a changing signal, and a precision pin measurement unit ("PPMU") for performing accurate pin tests of AC signals. Each of the four described elements is employed with a separate circuit. Each pin tester board can test at least one pin of the DUT. In some instances, a pin tester board is configured to test only a single pin of a device under test.

With the progression of technology, new elements are being added to integrated circuits that also need to be tested. For example, infrared sensors are becoming more commonly employed for a variety of purposes, including remote temperature sensing, spectroscopy, photography, and surveillance systems. Thus, there is a desire to incorporate the infrared sensors on the same silicon as other electrical elements. ATE does not have the capability to test infrared sensors using traditional pin tester boards and therefore, any chips that employ infrared sensors presently need to be disconnected from the ATE and attached to a separate infrared tester.

Currently infrared testers are tested with specialized equipment that use blackbodies. Blackbodies are radiation sources with a nearly ideal emissivity in the infrared spectrum that are used as the IR source to generate IR radiation which is defined by the temperature of the blackbody. In order to remove interference radiation emitted by other objects especially around the line of sight to the blackbody it is common to use a mechanical system that would periodically shutter the IR source with a covering/shutter positioned between the IR source and the IR sensor being tested. In order to test an IR sensor at two temperatures, two different blackbodies would need to be used, requiring complex mechanical manipulation.

An example in the prior art of testing an IR sensor is found in U.S. Pat. No. 7,119,326 to Logsdon et al. and is described with reference to FIG. 1. An IR sensor 125 is placed in an oven 110, which is heated to a first temperature. Two blackbodies 160, 165, heated to a second and a third temperature respectively, are mounted on a moveable track 130. The second and third temperatures of the blackbodies are both higher than the first temperature in the oven. IR sensor 125 is exposed to IR radiation from blackbody 160 through a window 120 in oven 110, which causes IR sensor 125 to produce a first output voltage, which is stored. Track 130 moves so that neither blackbody 160 or 165 is aligned with window 120, and a heating element attached to IR sensor 125 heats IR sensor until the first output voltage is reached again by applying a first power level to the heating element. The first power level is stored. Then track 130 moves to bring blackbody 165 in line with window 120. IR sensor 125 is exposed to IR radiation from blackbody 165, which causes IR sensor 125 to produce a second output voltage, and this voltage also is stored. Track 130 moves so that neither blackbody 160 or 165 is aligned with window 120, and the heating element attached to IR sensor 125 heats IR sensor until the second output voltage is reached again by applying a second power level to the heating element. The second power level is stored. The first and second power levels, measured as just described, can then be compared to first and second power levels measured in the same way for other IR sensors, and if the measured power levels are sufficiently similar, IR sensor 125 is then known to have the desired base output level and output sensitivity.

It is desirable to test IR sensors quickly and without onerous mechanical manipulations. It would be desirable to test IR sensors without the need to place them in ovens, which may then require time to reach or return to a target temperature. It would be further desirable to test IR sensors without needing to perform time-consuming mechanical manipulation of blackbodies or use a mechanical shuttering mechanism with moving parts. And it would be further desirable to test IR sensors directly according IR radiation emitted by an IR source, as opposed to using a heating element attached to the IR sensor, because in most desired applications, the IR sensor will be used to sense distant radiation and not heat applied directly to the IR sensor.

SUMMARY OF THE INVENTION

Embodiments of the invention are directed to infrared sensor testers that are to be used with automatic test equipment (ATE). A first embodiment of the invention includes an infrared source that emits an infrared test signal representative of a test temperature and a signal processor that processes a sensed signal from an infrared sensor of an integrated circuit that is being tested by the ATE to determine a measured temperature. The signal processor may be a general purpose processor or the signal processor may be a digital signal processor. In certain embodiments, processing functions may be split among several different processors.

In some embodiments, a heat mass is thermally coupled to the infrared source and is heated to a predefined temperature that is above ambient temperature. The temperature of the heat mass may be several hundred degrees Fahrenheit. The signal processor may include an electronic frequency modulator that modulates the infrared source with an electric signal according to a predetermined test frequency such that the infrared source emits an infrared test signal representative of a test temperature. Thus, the infrared source uses the thermal energy from the heat source along with the frequency modulation to produce the test temperature. The frequency of the modulation of the infrared source can also be used to isolate the energy components that the infrared sensor senses that are due to the test signal from the energy components that are sensed due to other infrared energy (e.g. ambient temperature and other heat sources). The signal processor may convert the sensed signal into frequency components. The components associated with the modulation frequency can be retained and all other frequency components discarded. The frequency components can then be converted back into the energy domain and the measured temperature determined. A processor, such as the signal processor can then compare the measured temperature to the known test temperature to determine the accuracy of the infrared sensor on the integrated circuit.

In embodiments of the invention, a heater element can be part of the apparatus and used for heating the heat mass to the heat mass temperature, which may be above ambient temperature. The heat mass can thus provide the infrared source with a temperature above ambient temperature, which helps ensure that the infrared sensor is sensing the radiation from the infrared source, and not background radiation. The apparatus also may include an infrared filter for filtering the test signal before it reaches the infrared sensor, which can further ensure that the infrared sensor properly senses the desired radiation source. The apparatus also may include a light pipe for filtering out reflected and refracted infrared signals, so that only parallel infrared waves from the test signal reach the infrared sensor. The apparatus also can include a temperature sensor for measuring a sensed temperature of the heat mass, and a temperature processor for receiving the sensed temperature and adjusting a temperature setting signal to the heat source until the sensed temperature equals the first temperature in a feedback loop. Accordingly, the temperature of the heat mass can be kept substantially constant, contributing to a more stable test environment.

Because the apparatus can be used with automatic testing equipment, an integrated circuit holder can be provided for holding the integrated circuit during automatic testing. Accordingly, pin electronics for use with automatic testing equipment can be provided, including comparator, an active load, and a driver, which can be coupled to the integrated circuit holder. The apparatus also includes a vacuum holder for placing the integrated circuit into an integrated circuit holder prior to testing and removing the integrated circuit after testing.

The infrared source may have a short thermal time constant, such as one that is less than 100 ms. The infrared source may be a wire wound filament or a thin film flat source. By selection of a small infrared source, space can be saved compared to the use of larger infrared sources. By saving space, automatic testing may be done in parallel, such that multiple infrared sensors are tested simultaneously. Having a short thermal time constant allows the use of electronic chopping instead of mechanical chopping, allowing for chopping without the use of moving parts.

The short thermal time constant also allows for changing the power, frequency, or duty cycle of the modulation of the infrared source, in a related embodiment.

In an embodiment of the invention that requires multiple test temperatures, the electronic frequency modulator modulates the infrared source according to a first and a second predetermined test frequency. The infrared source thus emits two infrared test signals simulating a first and a second test temperature. The second test temperature will be associated with its own modulation frequency assuming that all other variables remain the same. The infrared sensor senses the second infrared test signal and outputs a second sensed signal. The signal processor processes the second sensed signal according to the second predetermined test frequency to determine a second measured temperature. In this way, the infrared sensor can be tested with multiple test temperatures using a single infrared source, and without the need to perform any mechanical manipulations. The infrared source may also produce a frequency modulated signal at one of a plurality of frequencies. Besides possibly providing differing test temperatures, such a mode of operation also can provide a more robust test environment, in that even if the infrared sensor were to pick up undesired background radiation at one test frequency, it is less likely that the same level of undesired background radiation will be present at each of a plurality of test frequencies.

Another embodiment of the invention is a method for testing an infrared sensor on an integrated circuit. In this embodiment, the method includes placing the integrated circuit into a holder of an automatic equipment tester, stimulating an infrared source with an electrically modulated signal producing an infrared test signal, receiving a sensor signal from the infrared sensor of the integrated circuit in response to the infrared test signal, and processing the sensor signal to isolate modulated information representative of the infrared test signal.

A heat source can be heated to a first temperature that is above the ambient temperature. The heat source can be kept proximate to the infrared source. The heat mass can thus provide the infrared source with a temperature above ambient temperature, which helps ensure that the infrared sensor is sensing the radiation from the infrared source, and not background radiation.

In a related embodiment, the method also includes measuring the temperature of the heat source with a temperature sensor, providing a measured temperature value to a processor, and, in response to the measured temperature value being different from the first temperature, adjusting a heating signal provided to the heat source until the measured temperature is equal to the first temperature. In this way, a steady, constant temperature may be achieved and maintained in the heat source, which in turn can allow for a cleaner and more stable infrared signal to be produced by the infrared source.

A frequency-based transform can be performed on the sensor signal, transforming the signal into frequency components. The frequency component within the sensor signal associated with the frequency at which the infrared signal was modulated can then be identified and compared with the test temperature. Background frequencies can be attenuated by filtering infrared frequencies of the infrared test signal with an infrared filter. Further removal of undesired radiation from the view of the sensor can be achieved by removing refracted and reflected waves of the infrared test signal with a light pipe, so that the infrared sensor receives only substantially parallel waves produced by the infrared source.

In a related embodiment, the method also includes stimulating the infrared source with a second electrically modulated signal producing a second infrared test signal, receiving a second sensor signal from the infrared sensor of the integrated circuit in response to the second infrared test signal, and processing the second sensor signal to isolate modulated information representative of the second infrared test signal. In this way, the infrared sensor can be tested at multiple test temperatures.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
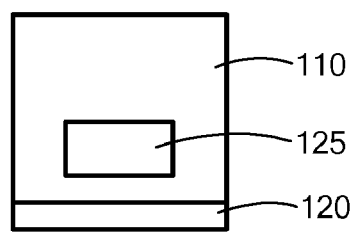
FIG. 1 shows an exemplary prior art IR sensor tester.
Figure 1:
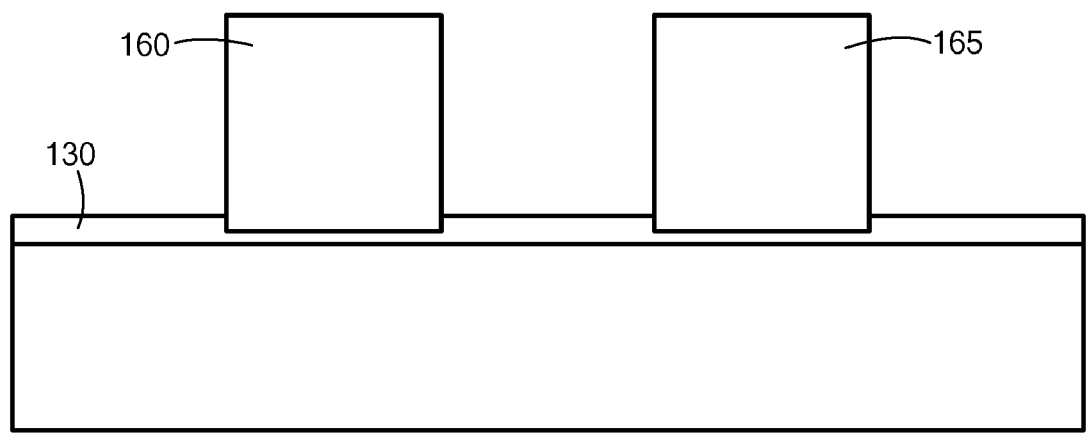
Figure 2:
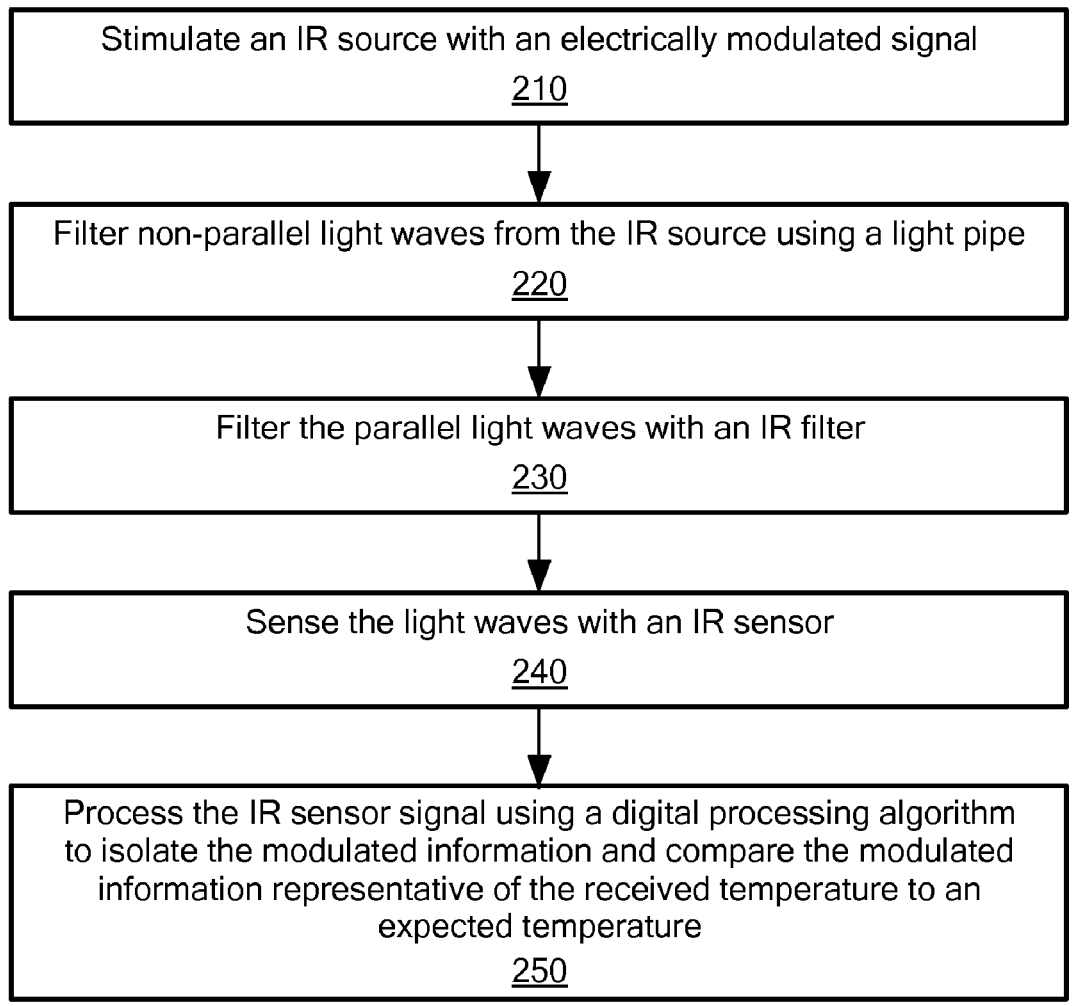
FIG. 2 shows a flow chart of the methodology employed in creating a stable production environment for testing infrared sensors.

FIG. 2 shows a flow chart of the methodology employed in creating a stable production environment for testing infrared sensors. As a preparatory step, a DUT containing an infrared sensor is placed in automatic test equipment (ATE). More than one DUT may be placed into the test environment at a time and the DUTs may be tested in parallel. In such an environment, each DUT would be associated with a separate IR source. In process 210 the IR source associated with the DUT is stimulated with an IR test signal modulated at a predetermined frequency for a specific test temperature. The test temperature may be associated with the peak power of a periodic waveform, such as a sinusoid. The IR source produces an IR signal at the desired temperature. The temperature is related to the power output and can be controlled by limiting the voltage amplitude. Accordingly, in some embodiments a single IR source may be used to simulate multiple temperatures in sequence by adjusting the voltage amplitude or the duty cycle used for the modulation. This embodiment has the advantage that multiple temperatures may be simulated in a stable test environment without the need to maintain multiple blackbodies at multiple temperatures, or to perform mechanical manipulations to move multiple IR sources into and out of the line of sight of the IR sensor being tested.

In process 220 the non-parallel light waves are filtered by a light pipe. In process 230 infrared light that is not of the desired wavelength is filtered with an IR filter. Thus, only parallel light waves of the appropriate wavelength are received by the IR sensor in process 240. The IR sensor provides the resulting IR signal to a processor. In process 250 the processor passes the signal through a digital signal processing algorithm such as a fast Fourier transform to obtain the frequency components of the signal. The processor then isolates the frequency components associated with the modulated frequency and transforms the isolated frequencies back into the time domain, at which point it determines the temperature sensed by the sensor based upon the amplitude of the signal at the test frequency. The sensed temperature can then be compared to the temperature associated with the test signal to determine the accuracy of the sensor. Thus, by modulating the test signal in combination with an IR filter and light pipe, a stable test environment is created.

Figure 3A:
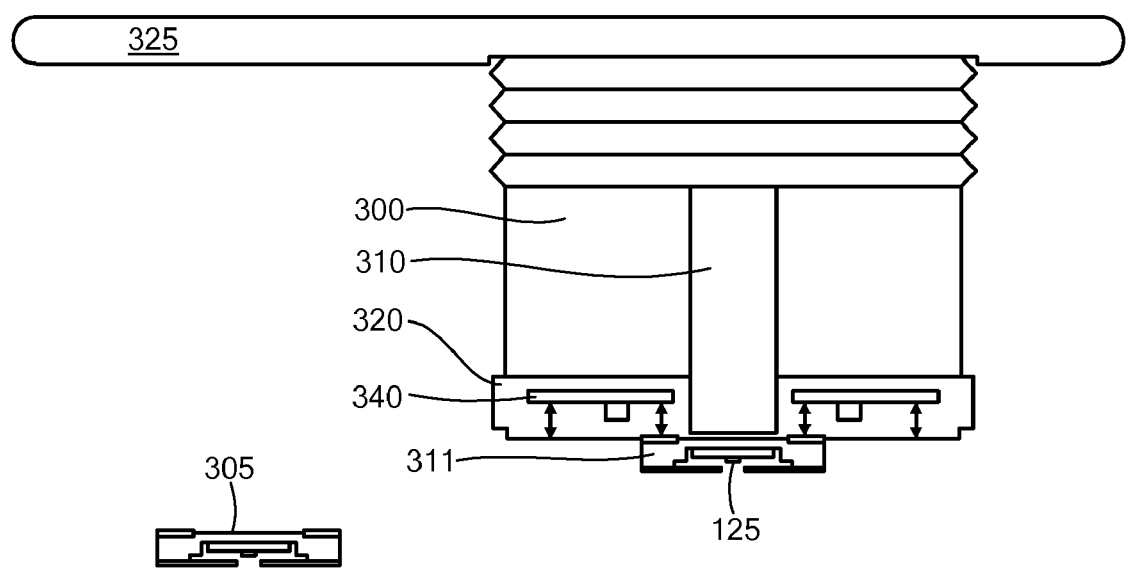
FIG. 3A shows a handler assembly for use with an IR sensor tester.

FIG. 3A shows a handler assembly 300 for use with an IR sensor tester. Handler assembly 300 includes a vacuum holder 310 for a device under test (DUT) 311, so handler assembly 300 can be moved to pick up an untested device 305 and carry it to the test position using a transport system 325. Attached to handler assembly 300 is a socket lid 320. Socket lid 320 includes an interconnect 340 with local decoupling. As shown, an IR sensor 125 inside DUT 311 faces away from vacuum holder 310.

Figure 3B:
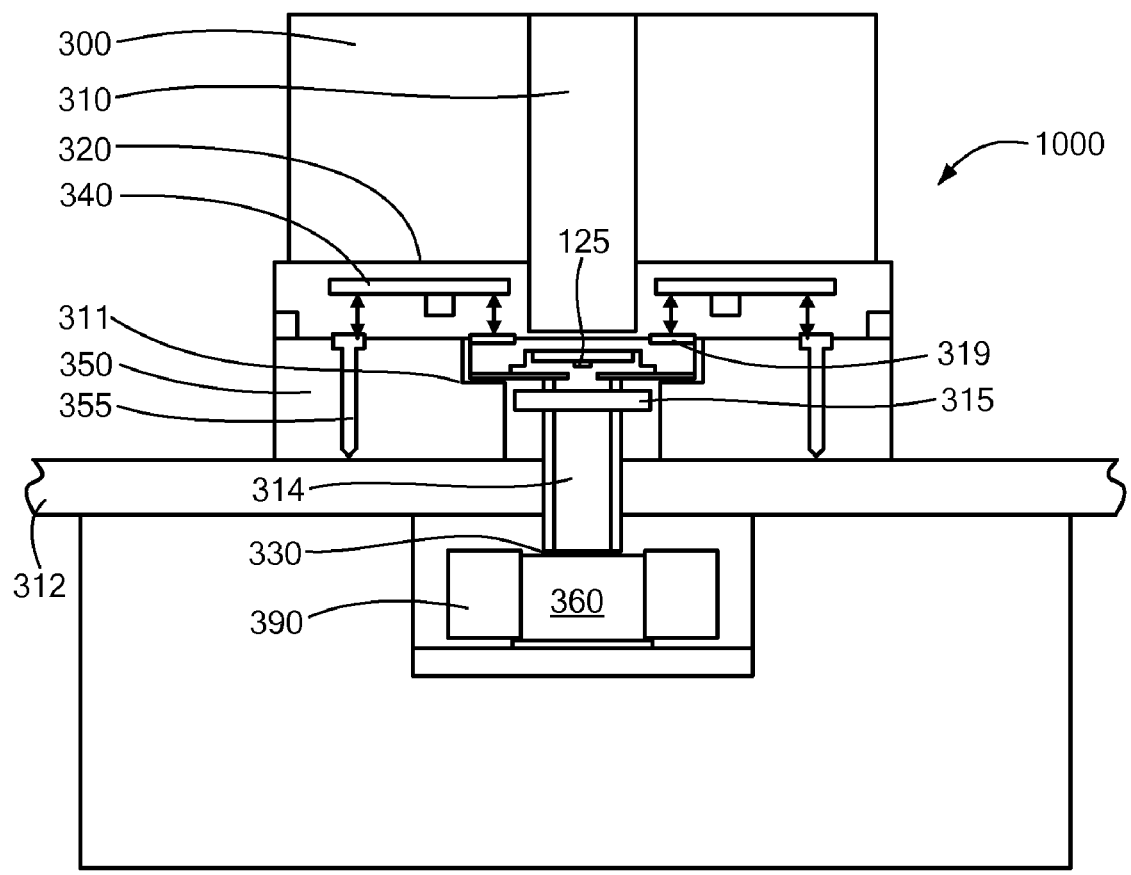
FIG. 3B shows an IR sensor tester in combination with conventional ATE test equipment.

The operation of an IR sensor tester is now described with reference to FIG. 3B, which shows an IR sensor tester 1000 with handler assembly 300 and vacuum holder 310 in the test position. Infrared sensor tester 1000 includes a miniature IR source 330 for testing a device under test (DUT) 311 that includes an infrared sensor 125. An exemplary miniature IR source is described below with reference to FIG. 4. Infrared sensor tester 1000 is electrically coupled to a test application board 312, which may also be referred to as a channel card 312, for testing the pins of DUT 311. Channel card 312 may include one or more pin electronic circuits for testing DUT pins. DUT 311 is positioned so that IR sensor 125 has a view of IR source 330 through test application board 312. A contact set 319 electrically connects the DUT to the test application board 312. A light pipe 314 is positioned between the IR sensor 125 of DUT 311 and IR source 330. Light pipe 314 allows light to pass through without being reflected back to the IR sensor 125 of DUT 311. By filtering non-parallel light, light pipe 314 simulates the functionality of a lens at a distance. IR filter 315 may be employed in order to filter IR frequencies dependent on the requirements of the DUT manufacturer. IR source 330 is provided with a heat source having a heat mass 360.

Heat mass 360 heats IR source 330 such that it maintains a temperature above the ambient temperature of the test room. Heat mass 360 is kept at a constant known temperature using a heater element, a temperature sensor, and a controller, such that there is a temperature feedback loop. By providing a constant temperature, the heat mass prevents the signal of the IR source from being distorted due to self heating. Otherwise, self heating in the IR source potentially could cause unwanted changes in the modulated IR signal of the IR source. IR source 330 is electrically modulated with a test signal to simulate test temperatures. Additionally, IR source 330 is modulated to eliminate the need for mechanical chopping. In certain embodiments, IR source 330 is modulated up to 60 Hz to simulate multiple test temperatures. By knowing the frequency at which the test signal is modulated, digital signal processing techniques can be used to extract the temperature test signal from the ambient temperature and any other sources producing an IR signal. A Fast Fourier Transform (FFT) is used to transform from the time domain to the frequency domain. In the frequency domain, the desired frequencies can be separated from the undesired frequencies, after which the desired frequencies are transformed back to the time domain to determine the sensed temperature. The test signal that modulates the IR source is produced by a processor within the sensor tester. Alternatively, the processor could be located external to the sensor tester. The selected IR source is capable of quick temperature changes and therefore, has a relatively short time constant compared to traditional IR sources that require mechanical modulation. The short time constant of the IR source makes it is possible to perform electronic modulation instead of mechanical modulation. In addition, in some embodiments a single IR source may be used to simulate more than one test temperature. For example, after simulating a first test temperature, by changing any of the amplitude or duty cycle of the modulation of the IR source, a second test temperature may be simulated.

IR sensor tester 1000 is preferably suitable for use with automatic testing equipment (ATE). Operation of IR sensor tester 1000 with ATE is described with further reference to FIG. 3B. Socket lid 320, during DUT testing in the test position, is mechanically coupled to a socket base 350. DUT 311 resides between socket lid 320 and socket base 350 on a DUT test board 312, and is electrically connected to test board 312 through interconnect 340 and pins 355. DUT test board 312 includes contacts that define each channel to a pin of the DUT. DUT test board 312 includes the pin electronics for testing the conventional electronics of the DUT. Because the handler assembly includes a vacuum producing element, the handler assembly can lift the DUT with a vacuum and replace the DUT when testing is complete. A light tube 314 resides between DUT test board 312, on which DUT 311 is being tested electrically, and IR source 330. As shown, DUT 311 is positioned with the contacts pointing up (also referred to as "dead bug"), so that the IR sensor 125 points to IR source 330 which is positioned behind DUT test board 312. Light tube 314 defines an optical path and IR source 330 is positioned so as to provide parallel infrared light to IR sensor 125 on DUT 311. The source assembly that includes heating elements 390 can be placed below the socket assembly as shown. Thus, modification of existing ATE equipment can be minimized in order to incorporate infrared testing, and testing of the integrated circuit may be performed either in parallel or sequentially, without the need to remove the DUT from the ATE.

Figure 4:
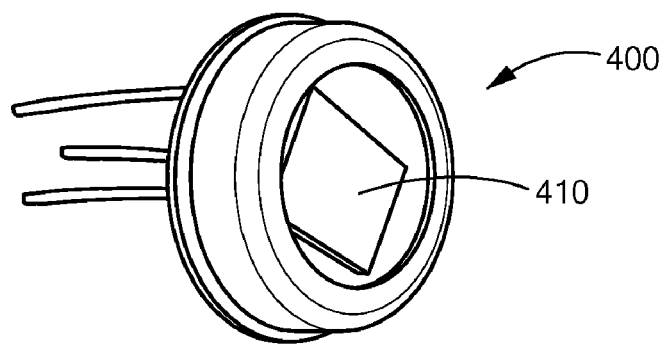
FIG. 4 shows an exemplary IR source.

FIG. 4 shows an exemplary IR source 400. The shown IR source 400 is a thin film 410 flat source. Thin film IR sources are known by those of ordinary skill. In one embodiment, the IR source consumes approximately 1 watt and heats to about 700 degrees Celsius with a 35 ms time constant. The IR source may be on the order of 1.7 mm square. For purposes of the present invention, the IR source preferably has a time constant that is short enough to allow for modulation of the IR source by an electrical signal that allows for filtering out the IR signal produced by the ambient temperature and other unmodulated IR sources. For this reason, it is preferred that the time constant be no greater than 100 ms. Modulation of the IR input signal may also serve the purpose of providing for temperature adjustment of the signal. In addition to thin film flat sources, other types of IR sources may be used, such as wire wound filaments.

The modulating signal for the IR source may be produced by providing a sinusoidal voltage signal to a PID (proportional-integral-derivative) controller. The PID controller controls the power provided to the IR source. With this type of modulation, the sinusoidal power output may be tracked with the sinusoidal voltage input and adjusted for accuracy.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An apparatus for use with automatic testing equipment for testing infrared sensors on integrated circuits, the apparatus comprising:
   an infrared source;
   a heat mass, thermally coupled to the infrared source, heated to a heat mass temperature;
   an electronic frequency modulator, coupled to the infrared source, wherein the electronic frequency modulator modulates the infrared source according to a predetermined test frequency, and wherein the infrared source emits an infrared test signal representative of a test temperature, the infrared test signal corresponding to the heat mass temperature and the predetermined test frequency;
   a signal processor, electrically coupled to an integrated circuit having an infrared sensor, wherein the signal processor receives a sensed signal from the infrared sensor in response to the infrared test signal and the signal processor uses the sensed signal according to the predetermined test frequency to determine a measured temperature.

2. An apparatus according to claim 1, wherein:
   the electronic frequency modulator modulates the infrared source according to a second predetermined test frequency;
   the infrared source emits a second infrared test signal simulating a second test temperature, the second infrared test signal corresponding to the first temperature and the second predetermined test frequency;
   the signal processor receives a second sensed signal from the infrared sensor in response to the second infrared test signal and the signal processor uses the second sensed signal according to the second predetermined test frequency to determine a second measured temperature.

3. An apparatus according to claim 1, wherein the infrared source has a thermal time constant that is less than 100 ms.

4. An apparatus according to claim 1, further comprising:
   a heater element for heating the heat mass to the first temperature.

5. An apparatus according to claim 1, wherein the first temperature is above ambient temperature.

6. An apparatus according to claim 1, further comprising a vacuum holder for placing the integrated circuit into an integrated circuit holder prior to testing and removing the integrated circuit after testing.

7. An apparatus according to claim 1, further comprising an infrared filter for filtering the test signal before it reaches the infrared sensor.

8. An apparatus according to claim 1, further comprising a light pipe for filtering out reflected and refracted infrared signals, so that only parallel infrared waves from the test signal reach the infrared sensor.

9. An apparatus according to claim 1, further comprising:
   a temperature sensor for measuring a sensed temperature of the heat mass;
   a temperature processor for receiving the sensed temperature and adjusting a temperature setting signal to the heat source until the sensed temperature equals the first temperature.

10. An apparatus according to claim 1, wherein the infrared source includes a wire wound filament.

11. An apparatus according to claim 1, wherein the infrared source includes a thin film flat source.

12. An apparatus according to claim 1, wherein the electronic frequency modulator produces a frequency modulated signal at one of a plurality of frequencies.

13. An apparatus according to claim 1, further comprising:
   an integrated circuit holder for holding the integrated circuit during automatic testing.

14. An apparatus according to claim 13, further comprising:
   a comparator;
   an active load; and
   a driver;
wherein the comparator, active load, and the driver are electrically coupled to the integrated circuit holder.

* * * * *